US010579956B1

(12) United States Patent
Thakkar et al.

(10) Patent No.: US 10,579,956 B1
(45) Date of Patent: Mar. 3, 2020

(54) VERIFYING USER-PROVIDED DATA FEEDS

(71) Applicant: Amazon Technologies, Inc., Seattle, WA (US)

(72) Inventors: Chirag Nikanth Thakkar, Seattle, WA (US); Nicholas Bailey, Seattle, WA (US); James Baumgarten, Seattle, WA (US); Sean Blackbourn, Edmonds, WA (US); Stephen Matthew Curial, Seattle, WA (US); Thomas Dunn, Seattle, WA (US); Saurabh Gupte, Seattle, WA (US); Bradie Loeffel, Seattle, WA (US); Hongyang Sun, Seattle, WA (US); Ananth Vyasarayamut, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 748 days.

(21) Appl. No.: 15/233,875

(22) Filed: Aug. 10, 2016

(51) Int. Cl.
*G06Q 10/08* (2012.01)
*G06F 17/24* (2006.01)

(52) U.S. Cl.
CPC ....... *G06Q 10/0838* (2013.01); *G06F 17/243* (2013.01); *G06F 17/248* (2013.01)

(58) Field of Classification Search
CPC .................................................. G06Q 10/0838
See application file for complete search history.

(56) References Cited

U.S. PATENT DOCUMENTS

| | | | | |
|---|---|---|---|---|
| 5,315,508 A | * | 5/1994 | Bain | G06K 17/00 705/28 |
| 5,923,014 A | * | 7/1999 | Szymusiak | G06Q 10/087 235/375 |
| 6,213,879 B1 | * | 4/2001 | Niizuma | H04L 7/0008 463/36 |
| 7,337,435 B2 | * | 2/2008 | Bell | G06F 8/61 717/121 |
| 7,592,912 B2 | * | 9/2009 | Hasek | G08B 25/085 340/539.16 |
| 7,895,050 B2 | * | 2/2011 | Greenstein | G06Q 10/0631 705/1.1 |
| 8,521,614 B1 | * | 8/2013 | Yalamanchi | G06Q 30/06 705/27.1 |
| 8,533,074 B1 | * | 9/2013 | Ehrhardt | G06Q 10/10 705/22 |

(Continued)

OTHER PUBLICATIONS

Riesen, Rolf, Message-Based, Error-Correcting Protocols for Scalable High-Performance Networks, University of New Mexico, Jul. 2002.*

*Primary Examiner* — Nathan Erb
(74) *Attorney, Agent, or Firm* — Thomas | Horstemeyer, LLP

(57) ABSTRACT

Disclosed are various embodiments for verifying user-provided data feeds. A data feed is received from a client and stored in a data store. An error detection process is initiated upon the data feed. A flag is set indicating that the data feed is being processed. A detected error from the error detection process is stored in the data store. The flag is updated indicating that processing of the data feed is finished upon completion of the error detection process. Upon a polling of the flag indicating that the processing of the data feed is finished, an update is generated to the user interface employed in the client to transfer the data feed. The update describes the detected error.

20 Claims, 5 Drawing Sheets

(56) References Cited

U.S. PATENT DOCUMENTS

| | | | | |
|---|---|---|---|---|
| 8,600,867 B2* | 12/2013 | Chiulli | G06Q 40/025 | 705/37 |
| 8,712,811 B2* | 4/2014 | Fredericks | G06Q 10/02 | 705/6 |
| 8,996,914 B2* | 3/2015 | King | G06F 11/327 | 714/20 |
| 10,116,613 B2* | 10/2018 | Fernandez Acuna | H04L 51/32 | |
| 2002/0019761 A1* | 2/2002 | Lidow | G06Q 10/02 | 705/5 |
| 2002/0184084 A1* | 12/2002 | Lidow | G06Q 10/02 | 705/7.36 |
| 2002/0194043 A1* | 12/2002 | Lidow | G06Q 10/02 | 705/7.25 |
| 2002/0194057 A1* | 12/2002 | Lidow | G06Q 10/02 | 705/7.31 |
| 2003/0195777 A1* | 10/2003 | Greenstein | G06Q 10/06375 | 705/7.37 |
| 2003/0195783 A1* | 10/2003 | Greenstein | G06Q 10/0631 | 705/7.12 |
| 2003/0208456 A1* | 11/2003 | Greenstein | G06F 9/5011 | |
| 2005/0177435 A1* | 8/2005 | Lidow | G06Q 10/06 | 705/22 |
| 2005/0203804 A1* | 9/2005 | Suzuki | G06Q 10/06393 | 705/14.46 |
| 2006/0064344 A1* | 3/2006 | Lidow | G06Q 10/02 | 705/7.31 |
| 2007/0038673 A1* | 2/2007 | Broussard | G06Q 10/08 | |
| 2007/0174743 A1* | 7/2007 | Kuroki | G06F 11/073 | 714/57 |
| 2007/0282627 A1* | 12/2007 | Greenstein | G06Q 30/02 | 717/101 |
| 2008/0027780 A1* | 1/2008 | Greenstein | G06Q 10/0631 | 705/7.26 |
| 2008/0154631 A1* | 6/2008 | Greenstein | G06Q 30/02 | 705/1.1 |
| 2008/0215396 A1* | 9/2008 | Greenstein | G06Q 10/06375 | 705/7.38 |
| 2009/0012832 A1* | 1/2009 | Greenstein | G06Q 10/0631 | 705/7.12 |
| 2009/0276669 A1* | 11/2009 | Hoopes | G06Q 10/08 | 714/746 |
| 2010/0121831 A1* | 5/2010 | Lin | G06Q 30/02 | 707/706 |
| 2010/0262521 A1* | 10/2010 | Robinson | G06Q 10/08 | 705/29 |
| 2011/0052001 A1* | 3/2011 | Tan | G06Q 10/08 | 382/103 |
| 2011/0055172 A1* | 3/2011 | Tan | G06Q 10/08 | 707/692 |
| 2012/0290880 A1* | 11/2012 | Bardack | G06F 11/0709 | 714/37 |
| 2013/0283106 A1* | 10/2013 | King | G06F 11/327 | 714/49 |
| 2014/0136291 A1* | 5/2014 | Bolene | G06Q 10/0832 | 705/7.36 |
| 2014/0316967 A1* | 10/2014 | Ram | G06Q 30/08 | 705/37 |
| 2015/0228020 A1* | 8/2015 | Ram | G06Q 30/08 | 705/37 |
| 2015/0329288 A1* | 11/2015 | Pandit | G06Q 10/08 | 700/215 |
| 2016/0148307 A1* | 5/2016 | Ram | G06Q 30/08 | 705/27.1 |
| 2016/0241930 A1* | 8/2016 | Gould | G08B 27/005 | |
| 2016/0267082 A1* | 9/2016 | Wong | G06F 16/164 | |
| 2017/0149722 A1* | 5/2017 | Fernandez Acuna | H04L 51/32 | |
| 2017/0193445 A1* | 7/2017 | Bolene | G06Q 10/0832 | |
| 2018/0210791 A1* | 7/2018 | Helleren | G06F 11/1441 | |
| 2018/0276204 A1* | 9/2018 | Reiter | G08B 5/22 | |

* cited by examiner

| Confirm box count, weight, and dimensions | | | | |
|---|---|---|---|---|

Total number of boxes

[ 1 ] ( Set number of boxes ) ←— 103

| Box # | Box weight (lb.) | Box dimensions (in.) | | Remove |
|---|---|---|---|---|
| 1 | 12 | 25 x 30 x 30 | | ←— 106 |

Totals:      1

( Add another box )    ( Copy last box )
     109            112

Upload Box-Level Information

1. Add box details to your Pack List.

To improve receive time, download the pack list and tell us the quantity of each item in each box you intend to ship to us and expiration dates (if applicable).

( Download SKU list )   ( Download pack list )
                                                          115

2. Upload your completed pack list ——118

( Choose file ) C:\packlist.csv ( Upload now )
              121

Error: missing expiration date for item 1024 (box 1) ←— 124

VERIFYING USER-PROVIDED DATA FEEDS

BACKGROUND

Users may be asked to provide data to a service provider. One approach to providing data may involve a browser-based web interface or a custom application. However, it may be difficult to design a form by which all of the data may be entered. Also, the data may be entered by multiple users over time, thereby rendering the use of a single user interface impractical. In some cases, the data may be programmatically generated, and configuring automated logic to fill in a static or dynamic form may be cumbersome. Accordingly, data feeds comprising spreadsheets, extensible markup language (XML) files, comma separated value (CSV) files or other delimited files, and other types of data feeds may be employed in lieu of form filling in order to provide data. The data feed may be created and/or updated offline (or generated automatically), and then uploaded to the service provider.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 1 is a pictorial diagram of an example user interface rendered by a client according to various embodiments of the present disclosure.

DETAILED DESCRIPTION

Figure 2:
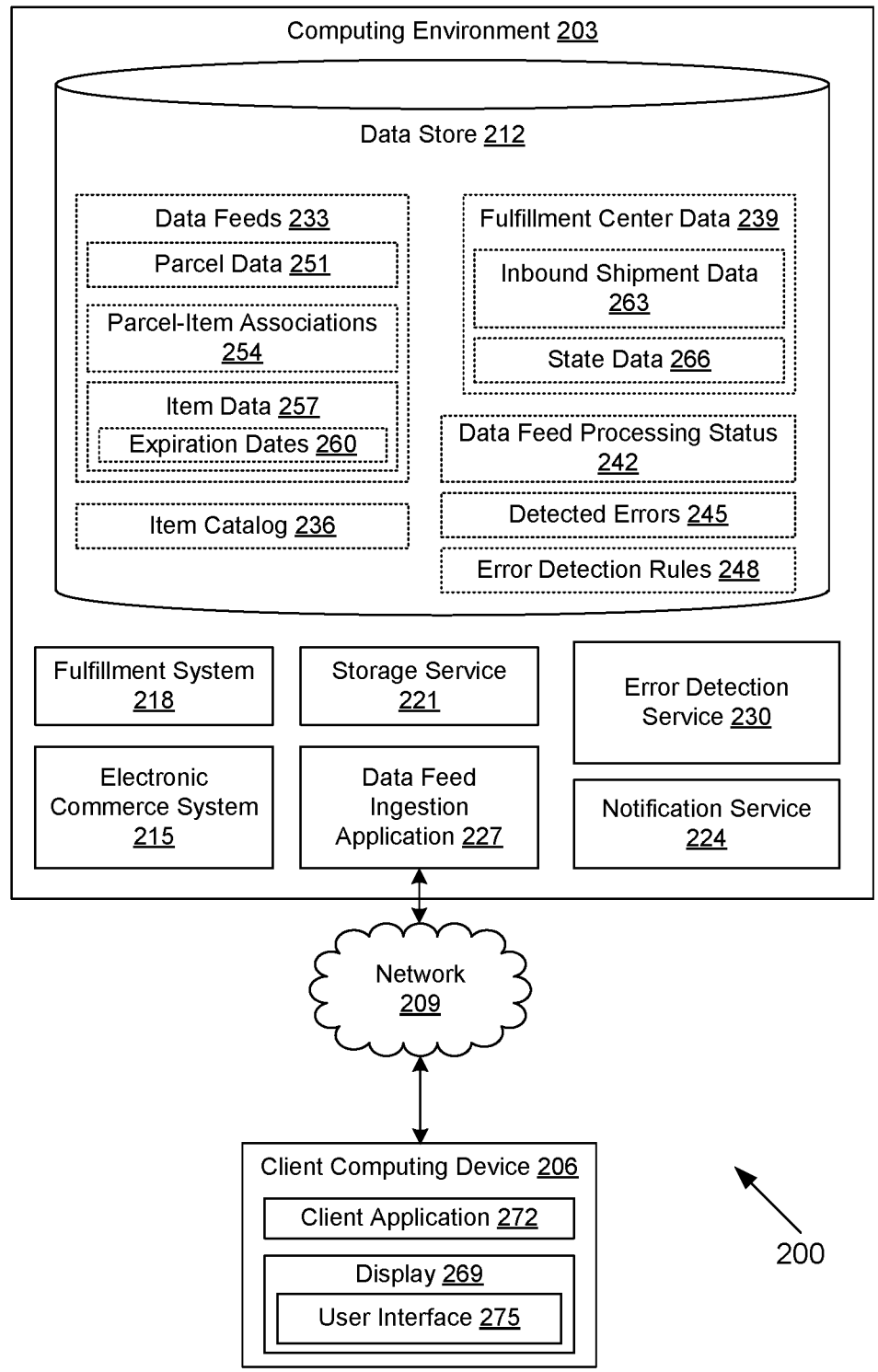
FIG. 2 is a schematic block diagram of a networked environment according to various embodiments of the present disclosure.

The present disclosure relates to verification of data feeds provided by users. Bulk data may be provided by users to a service provider for many reasons. In one such scenario, a service provider may correspond to a third-party fulfillment services provider that warehouses items on behalf of merchants for fulfillment and shipment to purchasers. Users in this scenario may upload a data feed to the service provider describing their inbound shipments to the service provider, such as parcel identifiers, what items are contained in each package, weight, dimension, and/or other data. The service provider may rely upon this user-provided data to update state data for a fulfillment center when shipments are received from the users. However, it is important that the data be correct so as not to introduce errors in the state data for the fulfillment center.

Various embodiments of the present disclosure provide a verification process for user-provided data feeds that is capable of processing the feeds quickly and returning error notifications to the users nearly instantaneously. An asynchronous processing framework is employed without locking in order to provide low latency characteristics. Other approaches having high latency provide a poor user experience, with users having to check repeatedly whether verification processing has completed. Error notifications can be provided in the same user interface as the data feed upload feature.

Turning now to FIG. 1, shown is a pictorial diagram of an example user interface 100 rendered by a client according to various embodiments of the present disclosure. The user interface 100 corresponds to a network page or application interface containing a form for transferring a data feed to a service provider. The form may be a web form or an application form. In this example, the user interface allows a user to provide information about an inbound shipment that will be sent to a fulfillment service provider. The user may correspond to a merchant who uses the services of the fulfillment service provider to warehouse items and pack and ship orders on behalf of the merchant. In addition, the fulfillment service provider may list the items for ordering via a web site or other platform.

In this example, the user can specify the number of parcels or boxes to be shipped via a parcel quantity specification tool 103 in the user interface 100. Based upon the number of parcels entered in the parcel quantity specification tool 103, a parcel detail specification tool 106 may be dynamically generated in the user interface 100 for each parcel to receive information regarding each parcel. In this case, the parcel detail specification tool 106 enables the user to specify a dimension (e.g., length by width by height) for each inbound parcel in the shipment. Feature 109, when selected, adds another parcel to the shipment, while feature 112 adds another parcel to the shipment with the same information as the last entered parcel.

A template download tool 115 enables a user to download an automatically generated template file for a data feed with the quantity of parcels and other parcel information entered previously. An item identifier download tool 118 enables a user to download a listing of item identifiers previously provided by the user. The upload tool 121 enables a user to upload a data feed with information associating items with particular ones of the specified parcels. In the data feed, the user may also specify condition information, such as an expiration date for one or more of the items. The expiration date may be required for certain categories of items, such as perishables.

Upon uploading of the data feed via the upload tool, the system verifies the data feed and detects whether there are any errors based on the data provided in the feed. For example, a user may specify three boxes in the data feed, but indicate that four boxes are being shipped. Alternatively, the user may fail to specify an expiration date for an item that requires an expiration date. If any errors are detected, the user interface 100 can be updated dynamically to present error information 124. This error information 124 can be shown nearly instantaneously, allowing the user to work on correcting errors in the data feed immediately if desired. In the following discussion, a general description of the system and its components is provided, followed by a discussion of the operation of the same.

With reference to FIG. 2, shown is a networked environment 200 according to various embodiments. The networked environment 200 includes a computing environment 203 and a client computing device 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include an electronic commerce system 215, a fulfillment system 218, a storage service 221, a notification service 224, a data feed ingestion application 227, an error detection service 230, and other applications, services, processes, systems, engines, or functionality not discussed in detail herein. The electronic commerce system 215 is executed in order to facilitate the online order of items over the network 209 through an electronic marketplace in which one or more sellers participate. The electronic marketplace may be operated by a proprietor who may also be a seller. The electronic commerce system 215 also performs various backend functions associated with the online presence of a seller in order to facilitate the online order of items. For example, the electronic commerce system 215 may generate network content such as web pages, mobile application data, or other forms of content that are provided to client computing devices 206 for the purposes of selecting items for purchase, rental, download, lease, or other forms of consumption.

The fulfillment system 218 comprises one or more backend services and/or other applications that facilitate fulfillment of orders for items from a materials handling facility. The materials handling facility may include one or more of, but is not limited to, warehouses, distribution centers, cross-docking facilities, order fulfillment centers (also referred to as fulfillment facilities), packaging facilities, shipping facilities, or other facilities or combination of facilities for performing one or more functions of material (inventory) handling.

The materials handling facility may comprise, for example, a large warehouse or other structure that includes a plurality of storage locations, such as bins, slots, shelves, containers, receptacles, crates, stalls, cribs, cordoned areas, or other locations, etc. Each of the storage locations has a respective capacity. An inventory of items is stored in the storage locations. In one embodiment, the materials handling facility is configured to process orders for goods from customers. The inventory stored in the storage locations is accessed to fulfill the orders from customers as might be the case, for example, where the materials handling facility comprises a fulfillment center.

Various functions that may be managed by the fulfillment system 218 and its components may include receiving inbound shipments of goods, directing agents to stow items in storage locations, directing agents to pick goods that have been ordered from the storage locations, managing sortation of the items, managing packaging of the items, and arranging for pickup and/or delivery to customers by shipping carriers.

The storage service 221 facilitates storage of data in the data store 212. To this end, the storage service 221 may store data within "buckets" that can be referred to by way of a uniform resource locator (URL). In one embodiment, the storage service 221 may receive data for storage and produce requested data via hypertext transfer protocol (HTTP). The notification service 224 receives messages on a topic for which one or more listeners are registered. Upon receiving the messages, the notification service 224 distributes the messages to the registered listeners. In one embodiment, the notification service 224 may employ a shared queue that can be written to and read by one or more entities. Both the storage service 221 and the notification service 224 may be provided to customers as a service under a utility computing model by the operator of the computing environment 203.

The data feed ingestion application 227 is executed to receive uploads of data feeds 233 from client computing devices 206 and to perform processing on the data feeds 233. The processing may include performing verification by the error detection service 230. In addition, the data feed ingestion application 227 may be configured to generate data feed template files that are prepopulated with formatting and some of the information required to be in the data feed 233. The data feed ingestion application 227 may also generate one or more user interfaces like the user interface 100 (FIG. 1).

The error detection service 230 performs a verification upon uploaded data feeds 233, and in particular, a verification that the uploaded data feeds 233 do not contain errors. If the error detection service 230 does detect errors, the errors may be surfaced to the user via a user interface generated by the data feed ingestion application 227. Some examples of errors detected by the error detection service 230 include a quantity of parcels described not matching a specified total quantity of parcels, a quantity of items not matching a specified total quantity of items, failure to specify an expiration date as required by an item category of an item, an expiration date past a threshold date, items with differing expiration dates being shipped within the same parcel, and/or other types of errors.

The data stored in the data store 212 includes, for example, data feeds 233, an item catalog 236, fulfillment center data 239, data feed processing status 242, detected errors 245, error detection rules 248, and potentially other data. The data feeds 233 correspond to user-provided data. In various embodiments, the data feeds 233 may correspond to spreadsheet files, comma separated value (CSV) files, delimited value files using tabs or other delimiters, extensible markup language (XML) files, and/or other files. The files containing the data feeds 233 may be automatically created initially as a template by the data feed ingestion application 227 with some of the information in the data feeds 233 being prepopulated.

A data feed 233 may include parcel data 251, parcel-item associations 254, item data 257, and/or other data. The parcel data 251 may comprise information about one or more parcels that are to be shipped to a service provider (such as a third-party fulfillment provider) as part of a shipment. The parcel data 251 may describe the type of parcel (e.g., box, pail, tube, pallet, or envelope), the weight of the parcel, the dimensions of the parcel, a total number of parcels, and/or other information.

The parcel-item associations 254 may associate identifiers of individual items with specific parcels to be shipped in a shipment. That is to say, the parcel-item associations 254 identify the content of the parcels in the shipment. The parcel-item associations 254 may indicate the quantities of the respective items in each parcel. The item data 257 provides information regarding specific items to be shipped. This information may include title, condition, stock keeping unit (SKU), weight, packaging type, hazardous classification, fragility classification, etc.

In particular, the item data 257 may specify expiration dates 260 for certain items. Expiration dates 260 may be required for certain categories of items, such as perishable items (e.g., food products) or seasonal items (e.g., holiday decorations). The expiration dates 260 correspond to dates by which the item may no longer be sold. The electronic commerce system 215 may be configured to mark down prices of items that are within a certain threshold of the expiration date 260 in order to liquidate them. Items that are past the expiration date 260 or within a threshold of the expiration date 260 may be returned to the seller.

The item catalog 236 contains a variety of information about items that are offered for order through the electronic commerce system 215 from the proprietor of the electronic commerce system 215 or third-party sellers. The items may correspond to products, goods, services, digital downloads, and/or other items. The item catalog 236 may include item title, description, price, weight, availability, customer reviews, shipping costs, categories, and/or other information. The items in the item catalog 236 may be fulfilled directly by a third-party seller or through the fulfillment system 218 by a fulfillment provider. Various incentives such as faster shipping or reduced shipping costs may be made available to customers to order items that are fulfilled via the fulfillment provider and the fulfillment system 218.

The fulfillment center data 239 includes various information about materials handling facilities that operate as fulfillment centers for the fulfillment system 218. In particular, the fulfillment center data 239 may include inbound shipment data 263, state data 266, and/or other data. The inbound shipment data 263 describes inbound shipments from customers that are to be received at a fulfillment center or another materials handling facility. The inbound shipment data 263 may be created from the user-provided data feeds 233 such that when a parcel bearing a unique identifier (e.g., barcode, radio-frequency identifier, etc.) is scanned upon receipt, the fulfillment system 218 is able to know exactly what items are contained within the parcel and update the state data 266 accordingly. The state data 266 describes the state of a fulfilment center, such as which items have been received in the fulfilment center and their current and assigned storage locations.

The data feed processing status 242 indicates a current status for processing uploads of data feeds 233. In particular, the data feed processing status 242 may include flags indicating a current progress of verification of a data feed 233 by the error detection service 230. The flags may indicate that a data feed 233 is currently being processed, or that processing of a data feed 233 has been completed.

The detected errors 245 are stored by the error detection service 230 by way of the storage service 221 when errors are detected in the data feed 233. The error detection rules 248 control the operation of the error detection service 230 and in particular what types of errors are to be recognized by the error detection service 230. For example, the error detection rules 248 may configure which categories of items require that expiration dates 260 be specified. The error detection rules 248 may also specify thresholds relative to which items having expiration dates 260 may be rejected (e.g., items having expiration dates 260 less than 30 days in the future may be rejected). The error detection rules 248 may also require that the total quantity of items in the shipment be equal to the sum of the quantity of items in each parcel of the shipment, among other data validations.

The client computing device 206 is representative of a plurality of client devices that may be coupled to the network 209. The client computing device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client computing device 206 may include a display 269. The display 269 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client computing device 206 may be configured to execute various applications such as a client application 272 and/or other applications. The client application 272 may be executed in a client computing device 206, for example, to access network content served up by the computing environment 203 and/or other servers, thereby rendering a user interface 275 on the display 269. To this end, the client application 272 may comprise, for example, a browser, a dedicated application, etc., and the user interface 275 may comprise a network page, an application screen, etc. The client computing device 206 may be configured to execute applications beyond the client application 272 such as, for example, email applications, social networking applications, word processors, spreadsheets, and/or other applications.

Figure 3:
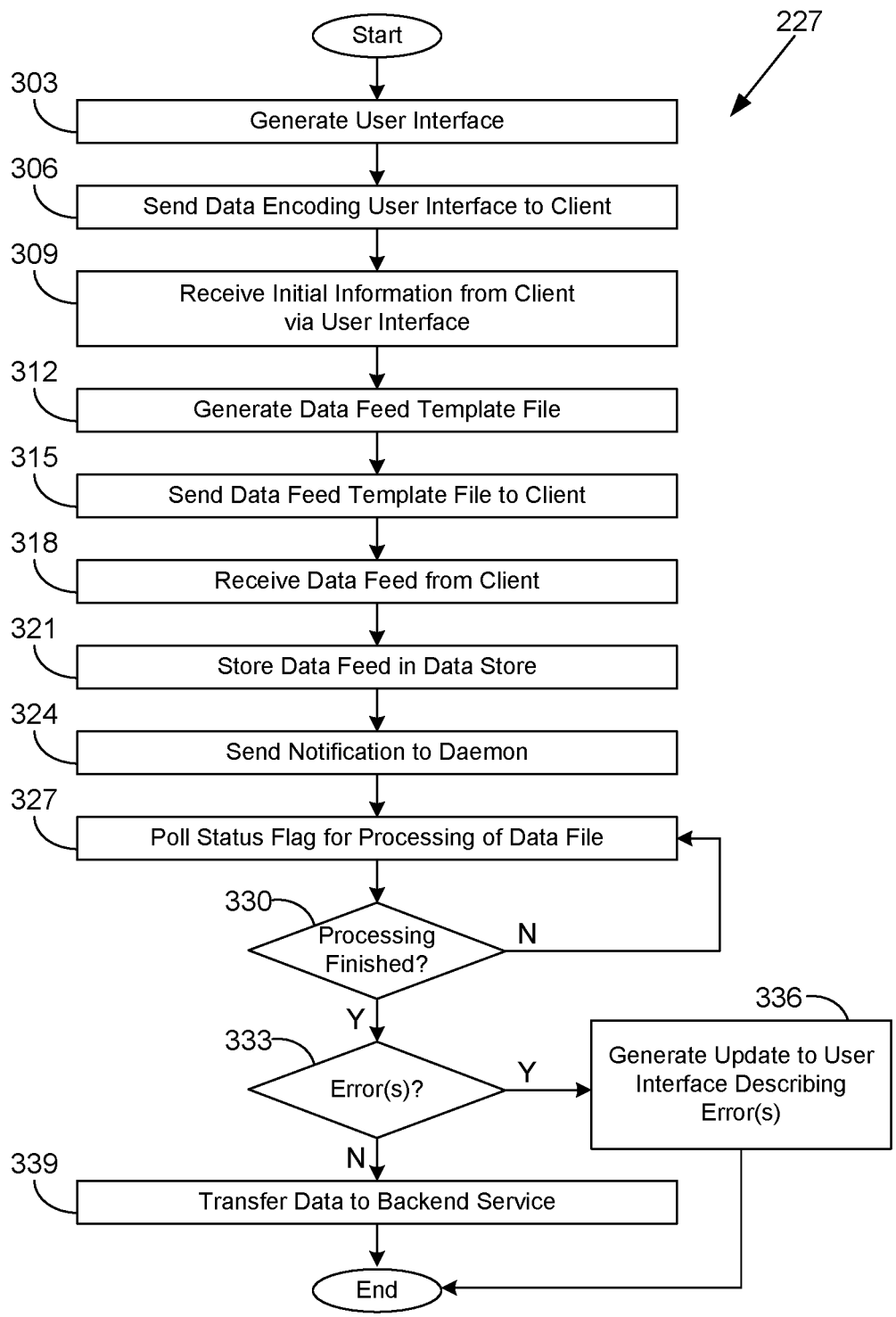
FIG. 3 is a flowchart illustrating one example of functionality implemented as portions of data feed ingestion application executed in a computing environment in the networked environment of FIG. 2 according to various embodiments of the present disclosure.

Referring next to FIG. 3, shown is a flowchart that provides one example of the operation of a portion of the data feed ingestion application 227 according to various embodiments. It is understood that the flowchart of FIG. 3 provides merely an example of the many different types of functional arrangements that may be employed to implement the operation of the portion of the data feed ingestion application 227 as described herein. As an alternative, the flowchart of FIG. 3 may be viewed as depicting an example of elements of a method implemented in the computing environment 203 (FIG. 2) according to one or more embodiments.

Beginning with box 303, the data feed ingestion application 227 generates a user interface 275 (FIG. 2). In the non-limiting example discussed herein, the user interface 275 corresponds to a network page that facilitates upload of a data feed 233 (FIG. 2) that describes an inbound shipment by a third-party seller to a fulfillment center. In box 306, the data feed ingestion application 227 sends data encoding the user interface 275 via the network 209 (FIG. 2) to the client computing device 206 (FIG. 2).

In box 309, the data feed ingestion application 227 receives initial information from the client computing device 206 via the user interface 275. For example, the initial information may define a total quantity of parcels, a total quantity of items, a listing of items, dimensions of parcels, or other information. The initial information may be entered via a web form in the user interface 275.

In box 312, the data feed ingestion application 227 generates a data feed template file from the initial information provided by the user. For example, the data feed template file may comprise a spreadsheet file, a delimited value file, an extensible markup language (XML) file, or another data format for specifying data. Various fields in the data feed template file may be prepopulated based at least in part on the initial information provided by the user. For example, the data feed ingestion application 227 may create unique parcel identifiers for each parcel in the proposed shipment and then create entries for information for each parcel in the data feed template file.

In box 315, the data feed ingestion application 227 sends the data feed template file to the client computing device 206. Afterward, the user may manually enter the requested data in the template for the data feed 233, such as the parcel-item associations 254 (FIG. 2), the item data 257 (FIG. 2), expiration dates 260 (FIG. 2), and/or other data. In one embodiment, the user may employ an automated tool to automatically populate the data feed 233. In box 315, the data feed ingestion application 227 receives the data feed 233 from the client computing device 206 over the network 209.

In box 321, the data feed ingestion application 227 stores the data feed 233 in the data store 212 (FIG. 2) via a storage operation performed by the storage service 221 (FIG. 2). In box 324, the data feed ingestion application 227 sends a notification to a daemon via the notification service 224 (FIG. 2). The notification indicates that a data feed 233 has been received and is ready for processing. Subsequently, in box 327, the data feed ingestion application 227 polls a status flag in the data feed processing status 242 (FIG. 2) to determine whether processing of the data feed 233 has completed. In box 330, the data feed ingestion application 227 determines whether processing is finished. If processing of the data feed 233 is not finished, the data feed ingestion application 227 returns to box 327 and continues polling the status flag.

If processing of the data feed 233 has completed or finished, the data feed ingestion application 227 moves to box 333 and determines whether any errors were detected in the data feed 233. If one or more errors were detected, the data feed ingestion application 227 reads the detected errors 245 (FIG. 2) from the data store 212 via the storage service 221 and in box 336, generates an update to the user interface 275 (FIG. 2) describing the detected errors 245. In this regard, the data feed ingestion application 227 may encode data for the update and then transfer the data to the client computing device 206 via the network 209. Thereafter, the operation of the portion of the data feed ingestion application 227 ends.

In some cases, the detected errors 245 may be of a relatively minor nature. For example, the total quantity of items that is specified may not be accurate, or there may be a minor typographical error in the data feed 233. In such cases, the data feed 233 may be transferred to a backend service, such as a service of the fulfillment system 218 (FIG. 2) and/or the electronic commerce system 215 (FIG. 2), so that inbound shipment data 263 (FIG. 2) describing the shipment from the data feed 233 is created. However, the corresponding inbound shipment data 263 may be flagged for manual processing of the shipment at the fulfillment center. In other cases, the detected errors 245 may be considered blocking errors such that the user must correct them before the inbound shipment data 263 is created. For example, it may be unacceptable in any event to specify expiration dates 260 (FIG. 2) that have already passed.

By contrast, if no errors are detected in box 333, the data feed ingestion application 227 continues to box 339. In box 339, the data feed ingestion application 227 transfers data from the verified data feed 233 to a backend service, such as a service of the fulfillment system 218 and/or the electronic commerce system 215, so that inbound shipment data 263 describing the shipment from the data feed 233 is created. Thereafter, the operation of the portion of the data feed ingestion application 227 ends.

Upon receipt of a parcel bearing a unique identifier at the fulfillment center, the fulfillment system 218 may notify the electronic commerce system 215 that the corresponding items known to be included in the parcel, as described in the inbound shipment data 263, are received and available for order. The item catalog 236 (FIG. 2) may then be updated by the electronic commerce system 215 to make the received items available for order.

Figure 4:
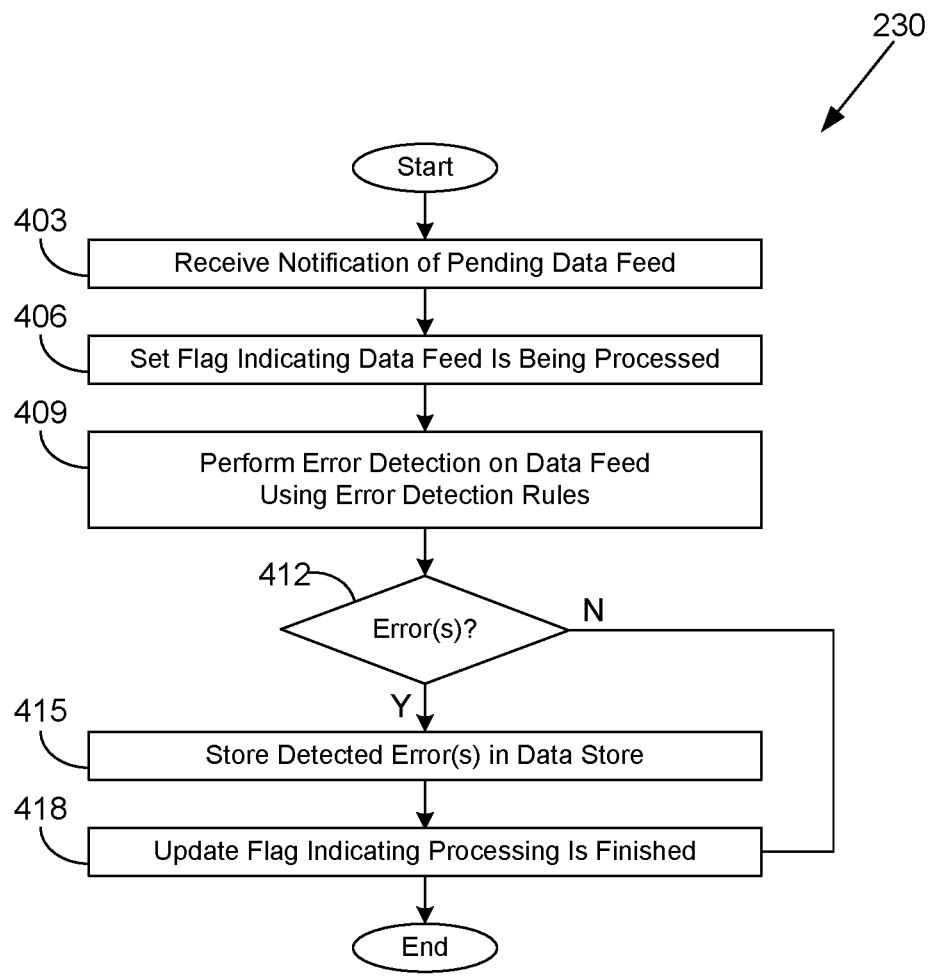
FIG. 4 is a flowchart illustrating one example of functionality implemented as portions of an error detection service executed in a computing environment in the networked environment of FIG. 2 according to various embodiments of the present disclosure.

Moving on to FIG. 4, shown is a flowchart that provides one example of the operation of a portion of the error detection service 230 according to various embodiments. It is understood that the flowchart of FIG. 4 provides merely an example of the many different types of functional arrangements that may be employed to implement the operation of the portion of the error detection service 230 as described herein. As an alternative, the flowchart of FIG. 4 may be viewed as depicting an example of elements of a method implemented in the computing environment 203 (FIG. 2) according to one or more embodiments.

Beginning with box 403, the error detection service 230 receives a notification via the notification service 224 (FIG. 2) that a pending data feed 233 (FIG. 2) has been received in the data store 212 (FIG. 2). In box 406, the error detection service 230 sets a status flag indicating that processing for error detection in the data feed 233 has started. The status flag can be stored in the data feed processing status 242 (FIG. 2) in the data store 212. In box 409, the error detection service 230 reads the data feed 233 from the data store 212 using the storage service 221 (FIG. 2) and performs error detection on the data feed 233 using the error detection rules 248 (FIG. 2).

In box 412, the error detection service 230 determines whether one or more errors have been detected. If one or more errors are detected, the error detection service 230 moves to box 415 and stores the detected errors 245 (FIG. 2) in the data store 212 using the storage service 221. The error detection service 230 may classify the detected errors 245 as minor errors or as blocking errors. The error detection service 230 continues to box 418. If the error detection service 230 determines that no errors have been detected, the error detection service 230 moves from box 412 directly to box 418.

In box 418, the error detection service 230 updates the status flag in the data feed processing status 242 to indicate that the processing has finished or completed. Thereafter, the operation of the portion of the error detection service 230 ends.

Figure 5:
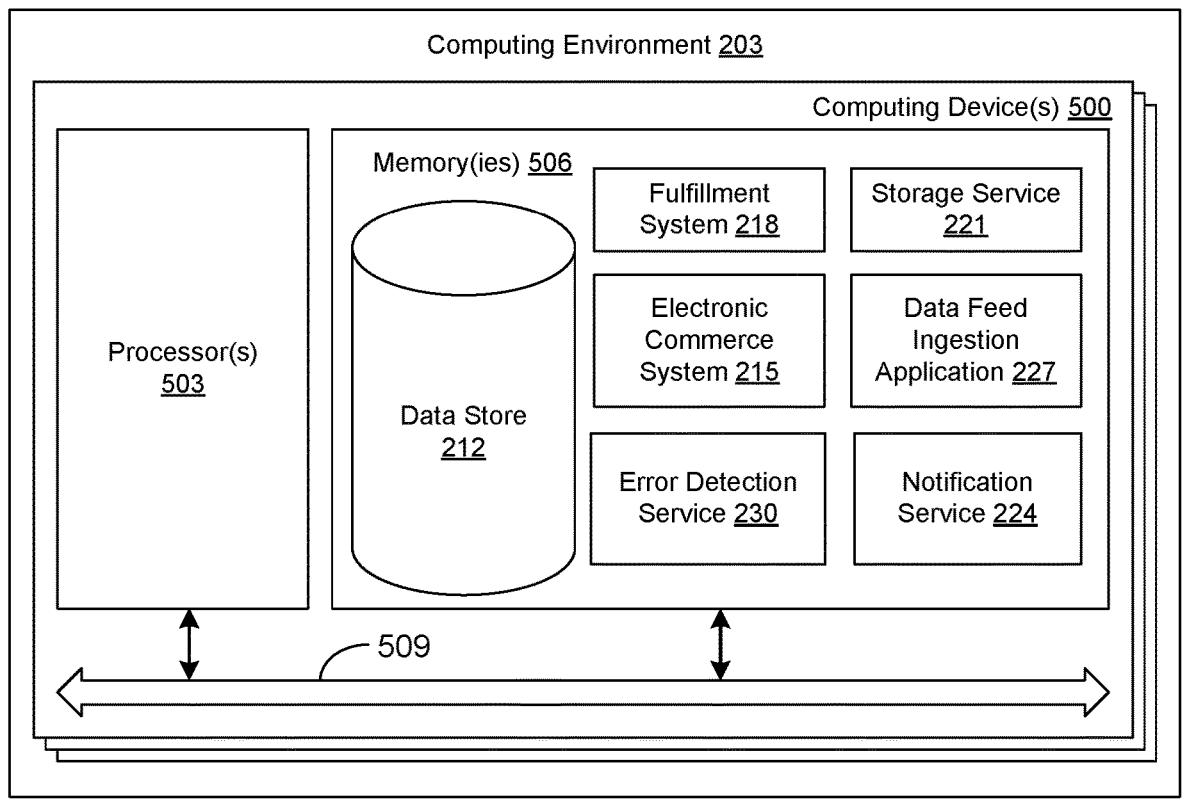
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the electronic commerce system 215, the fulfillment system 218, the storage service 221, the notification service 224, the data feed ingestion application 227, the error detection service 230, and potentially other applications. Also stored in the memory 506 may be a data store 212 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the electronic commerce system 215, the fulfillment system 218, the storage service 221, the notification service 224, the data feed ingestion application 227, the error detection service 230, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the data feed ingestion application 227 and the error detection service 230. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 215, the fulfillment system 218, the storage service 221, the notification service 224, the data feed ingestion application 227, and the error detection service 230, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the electronic commerce system 215, the fulfillment system 218, the storage service 221, the notification service 224, the data feed ingestion application 227, and the error detection service 230, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices 500 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying at least one program executable in at least one computing device, wherein when executed the at least one program causes the at least one computing device to at least:
    receive a data feed from a client, the data feed associating a plurality of items with at least one parcel in a shipment and providing condition data regarding individual ones of the plurality of items;
    store the data feed in a data store;
    send a notification to a daemon in response to storing the data feed;
    initiate an error detection process upon the data feed in response to the notification;
    set a flag indicating that the data feed is being processed in response to the notification;
    store a detected error from the error detection process in the data store;
    update the flag indicating that processing of the data feed is finished in response to completion of the error detection process; and
    in response to a polling of the flag indicating that the processing of the data feed is finished, generate an update to a user interface employed in the client to transfer the data feed, wherein the update describes the detected error.

2. The non-transitory computer-readable medium of claim 1, wherein the polling occurs concurrently with the error detection process.

3. The non-transitory computer-readable medium of claim 1, wherein when executed the at least one program further causes the at least one computing device to at least:
    generate a data feed template file based at least in part on a number of parcels and a listing of items; and
    send the data feed template file to the client, wherein the data feed corresponds to a user manipulation of the data feed template file.

4. A system, comprising:
    at least one computing device; and
    at least one service executable in the at least one computing device, wherein when executed the at least one service causes the at least one computing device to at least:
    receive a data feed from a client;
    store the data feed in a data store;
    initiate an error detection process upon the data feed;
    set a flag indicating that the data feed is being processed;
    store a detected error from the error detection process in the data store;
    update the flag indicating that processing of the data feed is finished in response to completion of the error detection process; and
    in response to a polling of the flag indicating that the processing of the data feed is finished, generate an update to a user interface employed in the client to transfer the data feed, wherein the update describes the detected error.

5. The system of claim 4, wherein when executed the at least one service further causes the at least one computing device to at least update expected inbound shipment data in response to completion of the error detection process.

6. The system of claim 5, wherein when executed the at least one service further causes the at least one computing device to at least:

receive a scan of a parcel identifier at a fulfillment center;
identify a quantity of items contained in a parcel corresponding to the parcel identifier based at least in part on the data feed; and
update state data for the fulfillment center to indicate that the quantity of items has been received.

7. The system of claim 4, wherein the data feed includes data associating a plurality of items with at least one parcel in a shipment and condition data regarding individual ones of the plurality of items.

8. The system of claim 7, wherein the error detection process further comprises determining that a quantity of an item in individual ones of the at least one parcel matches a total quantity of the item in the shipment.

9. The system of claim 7, wherein the error detection process further comprises determining that an expiration date associated with individual ones of the plurality of items is not earlier than a threshold date.

10. The system of claim 7, wherein when executed the at least one service further causes the at least one computing device to at least:
generate a data feed template file based at least in part on a number of parcels and a listing of items provided via a web form; and
send the data feed template file to the client, wherein the data feed corresponds to a user manipulation of the data feed template file.

11. The system of claim 4, wherein when executed the at least one service further causes the at least one computing device to at least send a notification to a daemon in response to storing the data feed, wherein the error detection process is initiated by the daemon in response to the notification, and the flag is set indicating that the data feed is being processed in response to the notification.

12. The system of claim 4, wherein the data feed comprises at least one of: a spreadsheet file, a delimited value text file, or an extensible markup language (XML) file.

13. A method, comprising:
receiving, by at least one computing device, a data feed from a client;
storing, by the at least one computing device, the data feed in a data store;
initiating, by the at least one computing device, an error detection process upon the data feed;
setting, by the at least one computing device, a flag indicating that the data feed is being processed;
updating, by the at least one computing device, the flag indicating that processing of the data feed is finished in response to completion of the error detection process;
in response to a polling of the flag indicating that the processing of the data feed is finished, generating, by the at least one computing device, an update to a user interface employed in the client to transfer the data feed; and
transferring, by the at least one computing device, data from the data feed to a backend service in response to determining that the data feed contains no errors.

14. The method of claim 13, wherein the data feed comprises an association of a plurality of items with a plurality of parcels in a shipment.

15. The method of claim 14, wherein the error detection process comprises:
determining, by the at least one computing device, that a particular item of the plurality of items is associated with an item category that requires an expiration date; and
determining, by the at least one computing device, whether the expiration date for the particular item is included in the data feed.

16. The method of claim 14, wherein the error detection process comprises:
determining, by the at least one computing device, that at least two of the plurality of items are associated with different expiration dates; and
generating, by the at least one computing device, an error in response to determining that at least two of the plurality of items are associated with a single parcel in the data feed.

17. The method of claim 14, wherein the error detection process comprises determining, by the at least one computing device, that a total number of items from the data feed equals a sum of a quantity of items associated with individual ones of the plurality of parcels.

18. The method of claim 13, further comprising:
generating, by the at least one computing device, a data feed template file based at least in part on a number of parcels and a listing of items provided via a web form; and
sending, by the at least one computing device, the data feed template file to the client, wherein the data feed corresponds to a user manipulation of the data feed template file.

19. The method of claim 13, further comprising storing, by the at least one computing device, a detected error from the error detection process in the data store.

20. The method of claim 19, further comprising causing the client to read the detected error from the data store, wherein the update to the user interface describes the detected error.

* * * * *